Feb. 26, 1929.

N. MINORSKY 1,703,317

AUTOMATIC STEERING DEVICE

Filed April 8, 1925    3 Sheets-Sheet 1

INVENTOR.
Nicolai Minorsky
BY
John Flam
ATTORNEY.

Feb. 26, 1929.

N. MINORSKY 1,703,317

AUTOMATIC STEERING DEVICE

Filed April 8, 1925     3 Sheets-Sheet 2

INVENTOR.
Nicolai Minorsky
BY
John Flam
ATTORNEY.

Feb. 26, 1929.　　　　　　N. MINORSKY　　　　　1,703,317
AUTOMATIC STEERING DEVICE

Filed April 8, 1925　　　3 Sheets-Sheet 3

INVENTOR.
Nicolai Minorsky
BY
John F. Lam
ATTORNEY.

Patented Feb. 26, 1929.

1,703,317

UNITED STATES PATENT OFFICE.

NICOLAI MINORSKY, OF LANSDOWNE, PENNSYLVANIA.

AUTOMATIC STEERING DEVICE.

Application filed April 8, 1925. Serial No. 21,557.

This invention relates to a scheme for maintaining the position of a body in a definite position; more particularly, the invention contemplates the provision of a system for automatically steering a body, such as a ship, airplane or the like, whereby such ships are caused to proceed on a predetermined course, independently of the disturbing influence of wind, wave, or the like.

In a prior application filed in my name on September 21, 1922, entitled "Directional stabilizer", and having Serial Number 589,627, I describe a system having the same general objects as the present invention, which is in the nature of an improvement over said earlier system.

In my present application, as in the earlier one, there is utilized an induction compass that comprises a rotating coil arranged to cut the earth's magnetic field, so as to generate an electromotive force which is a function of the relative positions of the axis of the coil and the direction of the field. This generated electromotive force is caused to influence, either directly or indirectly, certain control devices that operate on the steering mechanism of the body. As pointed out in the prior application, substantially deadbeat steering may be accomplished by operating the control devices not only in accordance with the value of this generated E. M. F. (which is a measure of the angle of departure of the body from its desired position) but also in accordance with one or more derivatives with respect to time, of this E. M. F., corresponding to such functions as the velocity and acceleration of the angular departure. It is one of the objects of my invention to improve in general this system as disclosed in my prior application.

It is another object of my invention to provide for a convenient and simple manipulation to adapt the steering device to the conditions of navigation, and to alter the adjustments of the device at will to suit the variations in these conditions. This is especially useful in connection with ocean going vessels, since in a rough sea, it is advisable to adjust the automatic steering in such a way that slight momentary deviations or yaw of the ship are not immediately corrected by the automatic device, as under such circumstances it is only the average deviation of the ship from her course that can be satisfactorily taken into account by the automatic steering device. On the other hand, when the ship rides on a quiet sea, the device can readily and accurately respond to even small deviations, and therefore the control may be so adjusted that the rudder is acted upon without delay in accordance with the instantaneous yawing.

It is still another object of my invention to make it possible to change without delay from automatic to manual control, and vice versa.

Still another object of my invention is to provide automatically for a variation in the intensity of the effect of the automatic steering.

My invention possesses many other advantages, and has other objects which may be made more easily apparent from a consideration of various embodiments of the invention. For this purpose I have shown several forms of my invention in the drawings accompanying and forming part of the present specification. I shall now proceed to describe in detail these forms, which illustrate the general principles of my invention; but it is to be understood that this detailed description is not to be taken in a limiting sense, since the scope of my invention is best defined by the appended claims.

Referring to the drawings.

Figure 1:
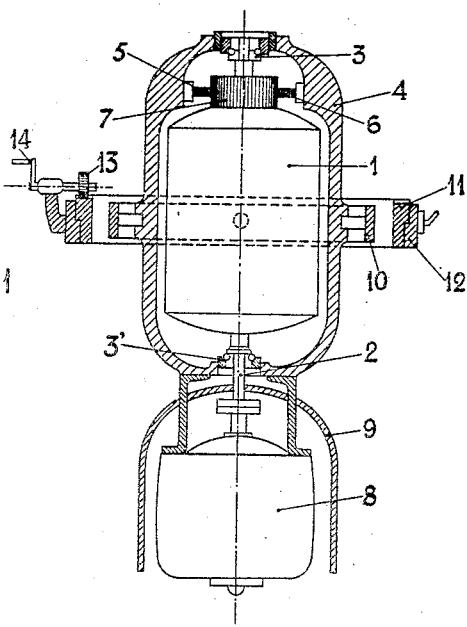
Figure 1 is a sectional view, mainly diagrammatic, of a form of induction compass that may be used in connection with my invention.

In the present instance the induction instrument that generates the controlling electromotive force, differs somewhat in construction from that shown in my prior application; nevertheless the theory of operation is similar, depending as it does, upon the use of the earth's magnetic field (or a component thereof) as the excitation for a moving coil or armature. Although any of a variety of different armatures may be utilized, I show a rotating direct current armature 1 having a shaft 2, and a commutator 7 at one end.

In order to ensure that only the horizontal component of the earth's field be active to influence this armature 1, I arrange it so as to maintain its shaft 2 always vertical. For this purpose, I use any well-known form of gimbal ring construction, comprising an external ring 11, an internal ring 10, diametrically pivoted in ring 11, and a frame 4 pivoted in the internal ring 10 on a diameter displaced by substantially 90° from the pivots of ring 10. In this way, movement out of the vertical of the body that is steered merely affects the relative positions of the rings 10 and 11, and leaves the axis of armature 1 unaltered in direction.

The frame 4 carries the upper and lower ball bearings 3 and 3' in which the armature 1 is journaled, as well as the brushes 5 and 6 that rest on commutator 7. For rotating the armature 1 at a rate rapid enough to generate a substantial controlling electromotive force, a small motor 8 is supported in any appropriate manner on frame 4, for driving shaft 2. In order to prevent any appreciable leakage of magnetism from the motor 8, which may adversely affect the operation of the armature 1, I preferably supply a magnetic shield 9 interposed between the motor 8 and the armature 1.

It is evident that by properly locating the line of the brushes 5 and 6 angularly with respect to the direction of the earth's horizontal component, the electromotive force at these brushes may be reduced to zero. This condition is chosen as that corresponding to the desired heading of the ship or other body steered. In order to permit this heading or course to be changed at will, a manually operated lever 14 is journaled near the edge of a supporting ring 12, fixed to the ship, and is used to rotate a pinion 13 meshing with teeth formed in the upper surface of the external ring 11. This ring of course is slidable within the ring 12. It is thus evident that rotation of arm 14 serves to move ring 11, and thereby the brushes 5 and 6 around the commutator 7. By properly positioning the line of these brushes with respect to the axis of the ship, the condition of zero E. M. F. generation can be obtained for any particular desired heading or course. Deviation of the ship from that course will cause the appearance of a potential difference between the two brushes 5 and 6, and this difference will be a continuous function of the angle of deviation, or of the yaw.

Since a function of the E. M. F. generated by armature 1 is utilized as the controlling element of vacuum tube devices, and not the current flowing in the windings, it is possible to use as conductors thereon, wires of fine crosss section. In order to produce a sufficiently large controlling E. M. F., there must be a large number of turns in series. In other respects, armature 1 is similar to the conventional cylindrical drum type of winding with parallel paths. The core of the winding may be made of magnetic material, such as special alloys of high permeability, to increase the number of lines of force threading the armature. This magnetic material may be disposed in any desired way, as for example, by using discs of the material imbedded in insulation.

One great advantage of the use of an induction compass for automatic steering, is that, being affected by the horizontal component of the earth's magnetism, it is similar to an ordinary magnetic compass, and all usual schemes for compensating such magnetic compasses can be applied to the induction compass.

Figure 2:
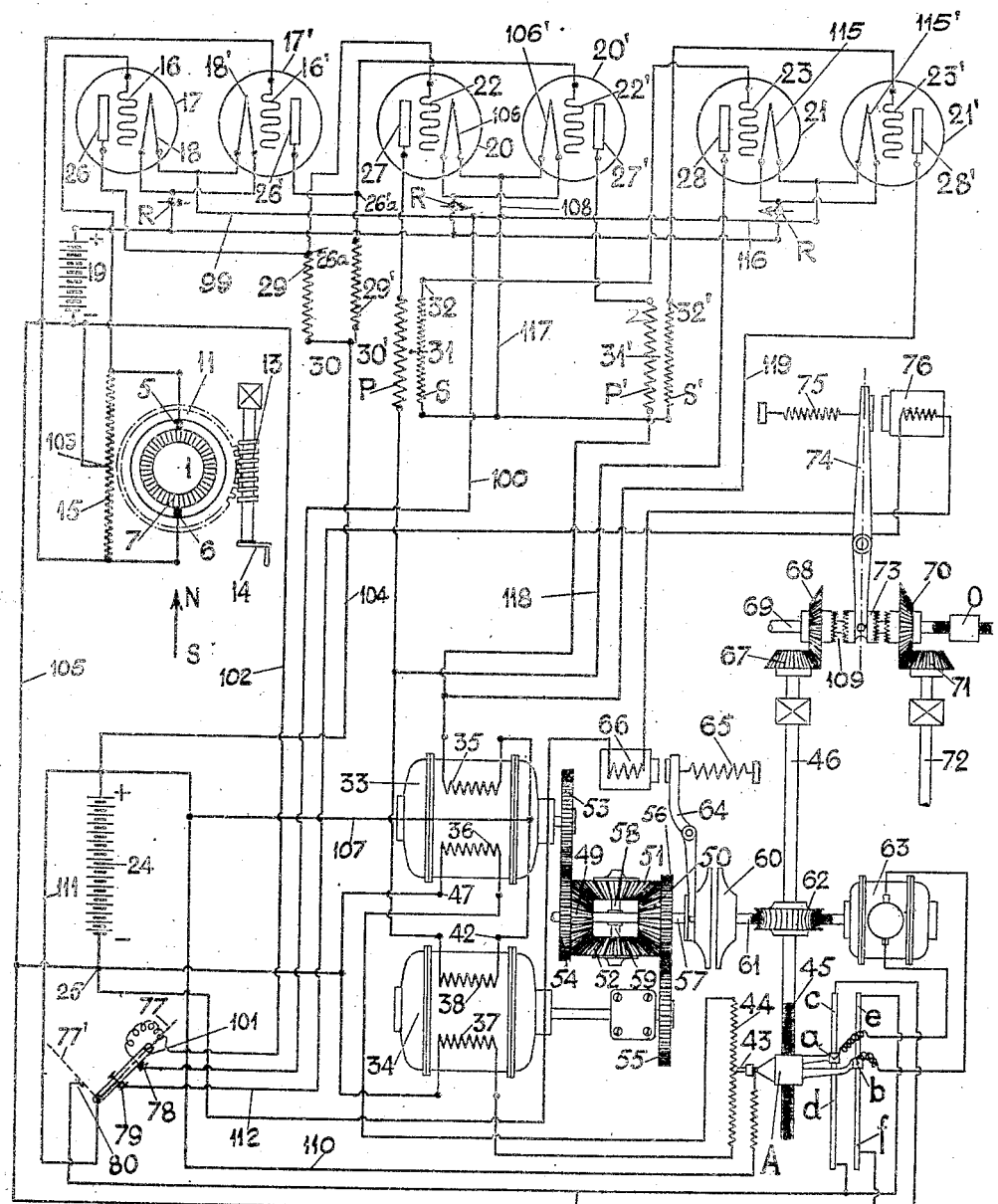
Fig. 2 is a wiring diagram of a complete steering device built in accordance with my invention.

The armature 1 and its associated parts are shown at the left in Fig. 2, in a diagrammatic manner only. The arrow N—S is intended to represent the direction of the earth's horizontal component. It is assumed in the present instance that for the condition of zero E. M. F. generation, the line of the brushes 5—6 must be parallel to the arrow N—S, although of course this depends on the way in which the leads from the armature 1 are connected to commutator 7. It is thus seen that, in Fig. 2, the conditions as represented correspond to no deviation or yaw of the ship upon which the system of Fig. 2 is installed.

Since the brushes 5 and 6 after being once set, are fixed with respect to the axis of the ship, deviation or yaw of the ship from her course will immediately result in a departure of the brushes from parallelism with arrow N—S. There will therefore appear a difference of potential across the brushes, which are used to affect the performance of a series of vacuum tube devices or triodes 17, 17', 20, 20', 21, 21', etc. These in turn control the operation of the rudder or other steering element, as by causing a control element 0 (at the right on Fig. 2) to operate. This element may be a rheostat, a valve, or the like, depending upon the particular kind of motive power that is utilized for moving the rudder. In general, element 0 represents a device controlling the speed of a source of motion connected to the rudder; but of course my invention is not limited to this form of control, since the element 0 may affect the position of the rudder in many other ways besides those mentioned.

The means whereby this element 0 is moved in accordance with a function of the E. M. F. generated across brushes 5—6 will be described in detail. As set forth at length in my prior application hereinbefore identified, I make use not only of the value of this E. M. F., but also of its first and second derivatives with respect to time. In this way, I obtain a controlling effect corresponding to a combination of the extent of yaw, the velocity of yaw, and of the acceleration of yaw. It is possible to demonstrate mathematically that such a control is substantially deadbeat, and serves to return the ship to her course without any appreciable oscillation. The contribution to the control, of the velocity element is similar to a "meeting" or "easing" action performed by a manual helmsman, who instinctively senses the velocity of yaw; and the contribution of the acceleration element if of the proper sense, causes an action equivalent to an effective decrease of the moment of inertia of the ship about its center of gravity. This can be clearly shown by the aid of differential equations. The net result of such a decrease in the effective moment of inertia is that the ship can be more easily handled.

I make use of the well-known property of vacuum electronic tubes, such as illustrated at 17 and 17', that the space or output current can be varied by varying the electrical potential of a point inside of the tube. This is usually effected by the aid of control electrodes 16 and 16' interposed between the two electrodes, such as an electron emitting electrode 18, 18', and a cold electrode or plate 26, 26'. The electrodes 18, 18' are caused to emit electrons by bringing them to a high temperature, and for this purpose, they are made filamentary and are caused to carry electric heating current, furnished from any convenient source, as for example, from the battery 19. The complete heating circuit for the filaments 18 and 18' may be traced as follows: from the positive terminal of battery 19, to a heating current control rheostat R, then both filaments 18, 18' in parallel, connections 99 and 100, contacts 78 disposed on a lever 101, and connection 102 back to the negative side of battery 19. The switch lever 101 is utilized, as will be explained later, to shut down the automatic system by opening this heating circuit when manually rotated to the dotted line position shown at 77'.

The two tubes 17 and 17' are controlled from the brush potentials of the armature 1, in such manner that as the potential across brushes 5 and 6 varies in value and sense, there is a corresponding variation in the space currents of the two tubes. For example, in the arrangement as shown, in case brush 5 has a potential higher than brush 6, then the space current through tube 17 is greater than that through tube 17'. On the other hand, in case brush 5 has a potential lower than brush 6, the space current through tube 17 is less than that through tube 17'. These variations in space current are caused to affect other instrumentalities, as will be described in detail later.

For the present, I shall describe the scheme of connections in detail for tubes 17 and 17'. In order to provide a neutral point, a resistance 15 of very high order as compared with that of the armature 1, is connected across the brushes 5 and 6, and its midpoint or neutral point 103 is connected to the negative side of the heating battery 19, and thereby to the electron emitting electrodes 18 and 18'. The two terminals are connected to the two control grids 16 and 16'. It is thus evident that the difference of potential between electrodes 16 and 18 is equal to that between the neutral point 103 and the brush 5; while the difference of potential between electrodes 16' and 18' is equal to that between neutral point 103 and the brush 6. When a potential difference exists between these brushes, it is seen that the grids 16 and 16' acquire potentials of opposite signs as regards their filaments 18 and 18', and therefore the space currents through these tubes differ from their value (corresponding to zero deviation of the brush line) in opposite senses. That is, the space current through tube 17 is increased when brush 5 is positive, while the space current through tube 17' is decreased.

The resistance 15 is made high since it is essential to reduce the current flow in the armature 1 to a negligible value, whereby the potentials at brushes 5 and 6 truly correspond to the generated values. There is of course no flow of current between the control electrodes 16, 16', the control effect being dependent only on the relative potentials of these electrodes and their corresponding electron emitting electrodes 18, 18'.

The space current paths for the tubes 17 and 17' may now be traced. For tube 17, this path includes the positive terminal of a plate battery 24 or other source of uniform potential, lead 104, a high resistance 29, junction point $26_a$, plate electrode 26, across the space between this electrode to filament 18, connection 100, contacts 78, connection 102, connection 105, to negative terminal 25 of battery 24. The resistance 29 is the equivalent of the usual plate circuit impedance, across which an amplified E. M. F. exists, as compared with the potential difference of the "input circuit," existing between electrodes 16 and 18.

The output or plate circuit of tube 17' may be similarly traced, and includes connection 104 from the positive terminal of battery 24, a high resistance 29', junction point $26'_a$, plate electrode 26', across the space to filament 18', thence connection 100, contacts 78, and connections 102 and 105 to the negative terminal 25 of battery 24.

We may assume, as we have done heretofore, that there exists a deviation of the body from its course which causes brush 5 to be positive as regards brush 6. This produces an increased flow of current through resistance 29, and therefore the potential of point $26_a$ is less than when no deviation existed. In an analogous manner, the potential point $26'_a$ is greater than when no deviation exists. These variations in potential are utilized to control two additional vacuum tubes 20 and 20′, and this is accomplished by connecting the control electrodes 22 and 22′ of these tubes respectively with points 26_a and 26′_a. These tubes also have electron emitting filaments 106 and 106′, which are connected in parallel through another control rheostat R, to the heating current battery 19, thence by way of connection 102, contacts 78, and connection 100 to the other terminals of the filaments.

Since these connections just traced are in electrical connection with the output circuits of both tubes 17 and 17′, the input circuits of tubes 20 and 20′ need be traced no further except to point out again that the control electrodes 22 and 22′ are connected to the points 26_a and 26′_a; thus the potentials of grids 22 and 22′ as compared with filaments 106 and 106′ vary oppositely and in accordance with the space current flow in the tubes 17 and 17′. It may here be noted also that while tubes 17 and 17′ are purposely designed with their associated circuits to produce a high degree of voltage amplication, the tubes 20 and 20′ are purposely designed as power amplifiers. Furthermore, although I illustrate one scheme of amplifier connection, it is of course possible to utilize other well-known schemes, since my invention is not concerned in any way with the particular form of amplifiers used nor with their circuits.

The currents flowing in the output circuits of tubes 20 and 20′ are caused to affect the element that serves as a source of motion for the control element 0. This element may be of any appropriate form, so long as it responds to produce a motion having a speed or magnitude that is a function of the difference between the currents flowing in the two output circuits of the two tubes 20 and 20′; and the direction of the motion must also be selective, so that when for example the output current of tube 20 is greater than that of tube 20′, the motion will take place in one direction, whereas when this current is less than that of tube 20′, the motion will be in the other direction.

These conditions are fulfilled by the apparatus disclosed, which includes in this instance two identical direct current motors 33 and 34, arranged to have their armatures connected to a common source of electrical energy, and being at least partly excited in accordance respectively with the output currents of tubes 20′ and 20. Thus motor 33 is jointly excited by the cumulatively wound field coils 35 and 36. The field coil 36 is excited in a manner which will be hereinafter described. The field coil 35 is so connected as to produce an excitation in accordance with the output current of tube 20′, and for this purpose it is placed in this instance directly in series with the output electrodes of tube 20′. This output circuit may therefore be traced as follows: from the positive, upper terminal of battery 24, connection 107, field coil 35, a primary P′ of a transformer 31′, plate 27′, filament 106′, leads 108 and 100, contacts 78, and leads 102 and 105 to the negative terminal 25 of battery 24.

Motor 34 has one of its field coils 37, which is cumulative with respect to coil 38, excited in a manner to be described hereinafter. The coil 38 is however, located in the output circuit of tube 20, and this circuit may be traced as follows: from the positive terminal of battery 24, connection 107, coil 38, primary P of a transformer 31, plate 27, filament 106, connections 108, and 100, contacts 78, and connections 102 and 105 to the negative terminal of battery 24.

The design of the circuits is such that when the ship has zero deviation and is stationarily on her course, the excitation of both coils 35 and 38 is such as to make both motors rotate at the same speed. However, upon a deviation to one or the other side of her true course, one of the two coils 35, 38 will be provided with an increased current flow, while the other will have a reduced current flow. The result is that the two motors 33 and 34 while always rotating in the same direction, will nevertheless have a difference in speed, which can be measured by the aid of mechanical differential gear device. In the form shown, this includes a bevel gear 49 fastened to a spur gear 54 which meshes with a gear 53 connected to the motor 33. Another bevel gear 50 is similarly driven from motor 34 by the aid of gears 55 and 56. Both bevel gears 49 and 50 are loose on a shaft 57, and are arranged to rotate in opposite directions. Short spindles 58 and 59 extend from and are supported on the shaft 57, and on these are rotatably mounted the bevel gears 51 and 52, each meshing with both gears 49 and 50. It is evident that while gears 49 and 50 have the same speed, there will be no motion of revolution of gears 51 and 52 about the axis of shaft 57; but a difference in speed will cause the shaft 57 to rotate in one or the other direction, dependent upon which of the two gears 49, 50 is the faster.

While the automatic steering system is in operation, the two parts of a clutch 60 are in engagement, and the motion of shaft 57 is transmitted thereby to another shaft 61. This shaft in turn transmits this motion ultimately to the controlling device 0. The mechanism includes a worm and wheel connection 61, 62, that serves to rotate a shaft 46, carrying a bevel gear 67. This gear meshes with another gear 68 that is loosely mounted on shaft 69. A clutch lever 74 is in such position while the automatic steering device is active, as to connect this gear 68 with a collar 73 splined to shaft 69, and movable longitudinally by lever 74. The mechanical connection may be accomplished by intermeshing of serrations 109. In this way, motion is imparted to shaft 69 and thereby to the controlling device 0.

It is sometimes desirable to arrange the device in such a way that the strongest effect on the rudder is produced for small deviations, and a gradual tapering off is secured as the yawing persists or increases. This can readily be accomplished by so varying the excitation of the motors as the yaw persists, as to tend to return their speeds to equal values. In the present instance I accomplish this result by varying the current flowing in the field coils 36 and 37, instead of maintaining them at constant excitation. I shall now proceed to describe how this variation is accomplished.

While the yawing is zero, the currents flowing in coils 36 and 37 are of such value as to maintain their resultant magnetization constant. The circuit for coil 36 may be traced as follows: from the upper positive terminal of battery 24, connection 110, contact 43, upper half of a resistance 44, coil 36, and back to the negative terminal 25 of battery 24. Similarly, the circuit for coil 37 may be traced as follows: from the upper positive terminal of battery 24, lead 110, contact 43, lower half of resistance 44, coil 37, back to negative terminal 25 of battery 24. The contact 43 is moved by rotation of shaft 46, as by the aid of the worm and nut connection A, 45, so as to vary the amount of resistances in series with coils 36 and 37, in opposite directions. Furthermore these variations are opposed to the variations in the corresponding coils 35 and 38, so that for instance, if the excitation of coil 35 increases due to the yaw, then the excitation of coil 36 decreases due to the movement of contact 43 downward. Since shaft 46 is rotated in response to the conditions of yaw as heretofore explained, the result is that while the yawing persists, the contact 43 is moved further and further, and the correction effect of the device is reduced. It is thus seen that there is introduced a time factor in the control, due to several factors: first—that the difference in speed of the two motors is integrated or summed up by the differential gear arrangement, and second—that this integration is itself active to reduce the difference in speed. These effects I find highly advantageous for securing substantially dead-beat steering.

As thus far described, the steering control is responsive only to the extent of the deviation of the ship from its course. Before describing how the velocity and the acceleration of the angular deviation also affect the movement of shaft 46 and thereby of the control element 0, it is advisable to set forth at this point how the steering can be changed from automatic to manual at the will of the operator. It is for this purpose that I provide the two clutches 60 and 73, 74. To render the automatic steering device active, the lever 101 is placed in the full line position. This lever controls the circuits for a pair of clutch controlling electromagnets 76 and 66; these circuits may be traced as follows: from the positive terminal of battery 24, connection 111, lever 101, connection 112, magnet 76, magnet 66, back to the negative terminal 25 of battery 24. The magnet 76 controls the position of lever 74, so that when energized, it pulls the lever to the right against the action of the spring 75, and causes engagement of collar 73 and gear 68. Similarly, when the magnet is deenergized, the spring 75 pulls the lever 74 to the left, and causes engagement of collar 73 and another bevel gear 70, loosely mounted on shaft 69. This gear meshes with another bevel gear 71, fixed to a shaft 72. This shaft is arranged to be manually operated by a helmsman to control the rudder, and of course this can be accomplished only when magnet 76 is deenergized; this condition corresponds to the placing of switch lever 101 in its dotted line position illustrated at 77'.

The clutch 60 is provided for the purpose of disconnecting the nut A from mechanical connection with the differential gear mechanism, and of thereby being able to return the contact 43 to its central position. This clutch is operated by a lever 64, urged to open position by a spring 65, but capable of being held in closed position by the magnetic force exerted by magnet 66. When lever 101 is in its dotted line position, this clutch 60 is open, and it is possible to rotate worm 45 without affecting the differential gear mechanism.

Although it is possible to arrange for the return of contact 43 to central position in several ways upon change from automatic to manual steering, I prefer to provide an automatic device for accomplishing this result. Thus there is a small electric motor 63 mechanically connected to the worm 61 for rotating it, and circuit arrangements are provided for controlling this motor. Thus when lever 101 is in the "manual" position 77', contact is made between point 80 and the lever 101, whereby the armature circuit for the motor 63 may be completed. In order to secure an automatic control of this circuit, I provide a switching arrangement that is active to energize motor 63 in either direction, depending upon the relative position of contact 43 and resistance 44. This arrangement includes four conducting bars $c$, $d$, $e$, $f$, arranged in parallel pairs, as shown, the bars $c$, $d$, or $e$, $f$, of a pair being separated by a short strip of insulation. When contact 43 is central of resistance 44, two other insulated contacts $a$ and $b$ also carried by nut A, rest upon the insulation between the bars. These contacts $a$ and $b$ are of course insulated from the nut A. However, in case contact 43 is for example above the center, or neutral point of resistance 44, contact is established between contact *a* and bar *c*, as well as between contact *b* and bar *e*. The motor 63 is then energized in such a direction as to lower contact 43, through the following armature circuit: from the upper positive contact of battery 24, connection 111, lever 101, connection 113, bar *e*, contact *b*, armature of motor 63, contact *a*, bar *c*, and connection 114, back to the negative terminal 25 of battery 24. In case the contact 43 is below the neutral point, then contacts *a* and *b* rest on bars *d* and *f*, and the direction of the current through motor 63 is reversed to raise contact 43. It is assumed of course that motor 63 has a constant field excitation. As soon as contact 43 returns to neutral, the contacts *a* and *b* rest on dead points, so that motor 63 stops.

It is now possible to proceed with the description of those portions of the apparatus that operate on the steering mechanism in response to the velocity of yaw, and to other higher time derivatives of yaw. The vacuum tubes 21 and 21' are provided to introduce the velocity factor, and from this description, it will become apparent how additional factors may be utilized. It will be remembered that in the output circuit of tube 20, a primary coil P of a transformer 31 was included, and that in the output circuit of tube 20', a primary coil P' of a transformer 31' was included. The corresponding secondary coils S and S' are included in the input circuits respectively of tubes 21 and 21'; that is, in the circuits connecting the control electrode 23 or 23' with the corresponding electron emitting electrode. Thus the input circuit of tube 23 may be traced as follows: from filament 115, connection 116 and 117, secondary coil S, and grid 23. The input circuit of tube 21' is entirely similar, and need not be outlined in detail, except to state that it includes the coil S'. Both coils S and S' have preferably a large number of turns as compared with their corresponding primaries, and the conductor used thereon may be very fine, since these coils have to carry no appreciable current.

It is now well-known that when a current through a primary coil such as P is steady and unvarying, there is no induced E. M. F. in the inductively coupled secondary coil S. However, upon a variation in current flow, corresponding to a variation in the yaw, an E. M. F. is induced, and is proportional to the velocity of this variation, or in other words, to the derivative with respect to time, of the yaw. Furthermore, the same considerations apply with respect to the secondary coil S', except that due to the connections, the induced E. M. F. is in the opposite sense from that in coil S. In this way, the amplifiers 21 and 21' (which are preferably power amplifiers) have variations in their output circuits in opposite directions, although proportional in each instance to the velocity of yaw.

The output circuit of tube 21 includes the battery 24, excitation coil 38, lead 118, and plate 28, whereby the output current of amplifier 21 is superimposed upon the output current of the amplifier 20 in coil 38. In a similar manner, the output circuit of tube 21' includes the battery 24, excitation coil 35, connection 119 and plate 28', whereby the output current of amplifier 21' is superimposed upon the output current of amplifier 20' in coil 35. Due to this arrangement, the coils 35 and 38 each carry currents which represent not only the extent of the yaw but its velocity, and the resultant motion of shaft 46 is a function of both these factors.

It is now possible to describe the operation of the system illustrated in Fig. 2. First let us assume that there is no deviation of the ship from her course, and that she is steady thereon. There is then no difference in potential across brushes 5 and 6, and consequently the same difference of potential exists between grid 16 and filament 18 as between grid 16' and filament 18'. The potential drops in resistance 29 and 29' are equal; grids 22 and 22' have the same relative potentials with respect to their filaments. Therefore the plate currents of both amplifiers 20 and 20' are equal, and coils 35 and 38 are supplied with equal currents from these circuits. Furthermore, since these plate currents are steady and unvarying, there will be no induced E. M. F.'s either in coil S or S', and the output currents of amplifiers 21 and 21' are also equal. Assuming that lever 101 has been previously placed into the position shown, contact 43 is centered; and both motors 33 and 34 have equal excitations, and their speeds are equal. No movement of shaft 61 results. The control element 0 is therefore stationary.

Now let us assume that a deviation develops that causes brush 5 to be increasingly positive with respect to brush 6. This results in making grid 16 more positive than before, and grid 16' less positive than before. Therefore there is an increased drop of potential across the resistance 29, and a reduced drop of potential across resistance 29'. This results in making grid 22' of lower positive potential than before, and in making grid 22 of higher positive potential than before. There is thus a larger flow of current through primary P and coil 38, and a reduced flow through primary P' and coil 35. If no further effect takes place, this would result in an increased speed of motor 33 and a decreased speed of motor 34, with a consequent rotation of shaft 46 in a direction to operate 0 to reduce this deviation.

But since the deviation has been assumed to be increasing, there is a variation in the current flowing in primary P, and this variation is caused to induce a positive E. M. F.

in coil S, whereby grid 23 becomes more positive than before. This permits a large plate current to flow, and the result is that the coil 38 has a still greater current flow than before. On the contrary, since the plate current through primary P' is decreasing, an E. M. F. is induced in coil S' that serves to lower the potential of grid 23' with respect to its filament 115', and due to this arrangement, there is a further decrease of current in coil 35.

From this description it is seen that upon the first yaw developing, the amplifiers 21 and 21' contribute a strenuous "meeting" effect. Furthermore, the control is perfectly continuous and uniform, the tubes being all operated on the straight portions of their characteristics. By inserting additional transformers and adding further tubes, a response in accordance with the acceleration of the angle of deviation can be obtained.

While the yaw is increasing, the effects just described take place; however, as soon as the ship reaches its position of maximum yaw, its velocity of yaw reduces to zero, and the plate currents at that instant of tubes 21 and 21' are unaffected by the secondaries S and S'. On the beginning of her backward movement to zero yawing, the current in primary P is decreasing, while that through primary P' is increasing. Therefore E. M. F.'s will be induced in the corresponding secondaries S and S' to produce the opposite effects from those existing when the yaw was increasing. The net result is that the difference in speed of the two motors 33 and 34 is reduced, and there is a pronounced "easing" action.

Due to the use of the movable contact 43, the rudder will be moved most energetically near its middle position, but as the deviation continues, the effect on the rudder is gradually tapered off. It is thus assured that there can be no indefinite increase in the controlling effect even when the yaw increases greatly. This helps to stablize the system and to damp oscillations.

By the use of the lever 101, which may be conveniently located, it is possible to change immediately from automatic to manual steering or vice versa. Furthermore the rheostats R in the filament heating circuits may be located in any convenient place where they may be readily available, as for example on the bridge, where the officer in charge may adjust these resistances so as to fix the performance of the automatic steering device in accordance with the conditions of navigation. For example, in squally weather or in a rough sea, the energization of the filaments may be reduced so that the device will not respond so strenuously to every momentary change in wind or to every wave, but instead it will operate more to keep the ship on her average course. On the contrary, in calm weather, the filaments can be fully energized to take care of every impulse tending to disturb the heading, and the ship will be held more rigidly on her course.

Figure 3:
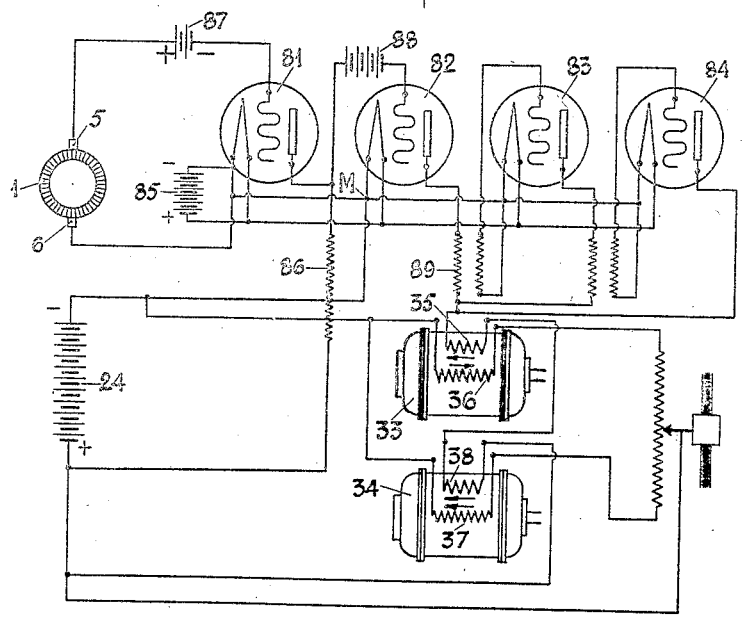
Fig. 3 is a wiring diagram of a modified form of my invention.

In the modification just described, the steering was made responsive to the extent of yaw and also to the velocity of yaw, this being accomplished by the aid of six amplifier tubes. It is not essential to use this circuit arrangement, however, and in the modification illustrated in Fig. 3, I use only four tubes 81, 82, 83, and 84, and these four tubes are arranged in a circuit that makes the steering respond also to the acceleration of the yaw. This factor, as pointed out heretofore, has the effect of reducing the apparent moment of inertia of the vessel.

In this embodiment, all of the filaments are heated from a common battery 85, and brush 6 of the compass 1 is connected to the negative side of this battery. The brush 5 is connected to the grid of tube 81, and this grid connection includes a grid biasing battery 87, whereby this tube is caused to operate on the straight portion of its characteristic, for the range of potentials developed at brushes 5 and 6. The output circuit of tube 81 includes a high resistance 86, serving as a coupling impedance for the succeeding tube 82. This tube 81 serves as a voltage amplifier. The output circuit battery 24 is, as before, connected at one terminal to the filaments, indicated by M, and its other terminal is connected to the resistor 86.

The amplifier tube 82 is arranged as a power tube; its grid is connected to the negative terminal of resistance 86, through a grid bias battery 88, serving the same purpose as battery 87. The output circuit of tube 82 includes the primary coil of a transformer 89, as well as the two field coils 35 and 38 for motors 33 and 34, mechanically arranged as before. The coil 35 is differential as regards the coil 36 in motor 33, while coil 38 is cumulative as regards the coil 37 in motor 34.

These coils 36 and 37 however are so arranged that while no deviation exists, the total excitations of both motors are equal, and the speeds are equal. As soon as a yaw develops, there is an increase (for example) in the plate current of tube 82; the result is a reduced total excitation of motor 33, and an increased total excitation of motor 34. The net result is that the speed of motor 33 will now be greater than that of motor 34, and the automatic device will operate in accordance with this speed difference. Now in case the deviation had been in the other direction, the current through coils 35 and 38 would have been reduced, and the total excitation of motor 33 would have been greater than that of motor 34. This would result in opposite speed effects of the control mechanism.

In order to introduce higher time derivatives in the control, the tubes 83 and 84 are provided, the output circuits of which also include the coils 35 and 38. The grid potential of tube 83 is determined by the E. M. F. induced in the secondary of transformer 89. This however is zero while the deviation is uniform, since the current through the primary coil is not changing. As soon as there is a velocity of deviation, there is a variation in current, and a corresponding induced E. M. F. affecting the control electrode of tube 83. There is then a corresponding change in the output current of tube 83, which affects the excitation of motors 33 and 34.

The last tube 84 is inductively coupled to tube 83 in the same manner that tube 83 is coupled to tube 82; its output circuit also includes the field coils 35 and 38. Therefore this tube contributes a factor to the control that is equivalent to the acceleration of the yaw. This in turn may be made to reduce the apparent moment of inertia of the vessel steered. It is evident that still more tubes can be added to be responsive to still higher time derivatives of the yaw, but for practically every circumstance, the arrangement shown is sufficient.

Figure 4:
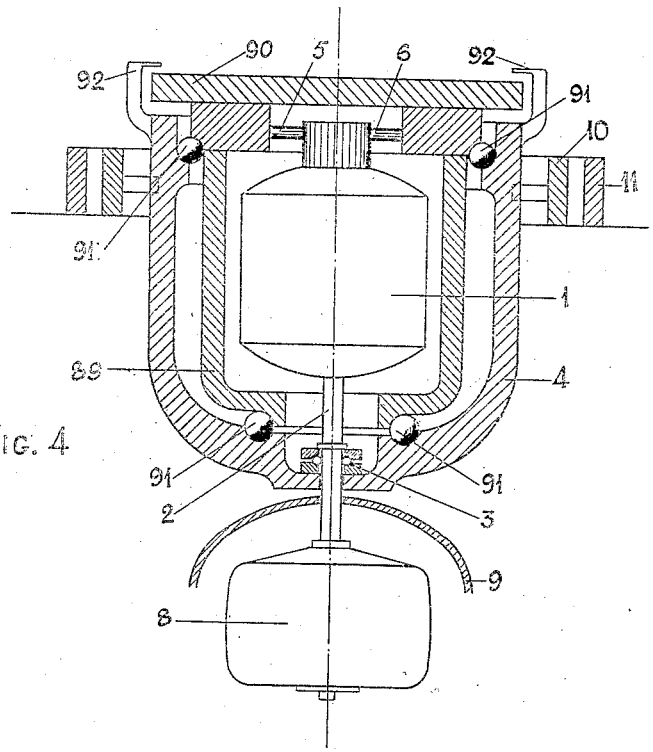
Fig. 4 is a diagrammatic sectional view of a modified form of induction compass.
Figure 5:
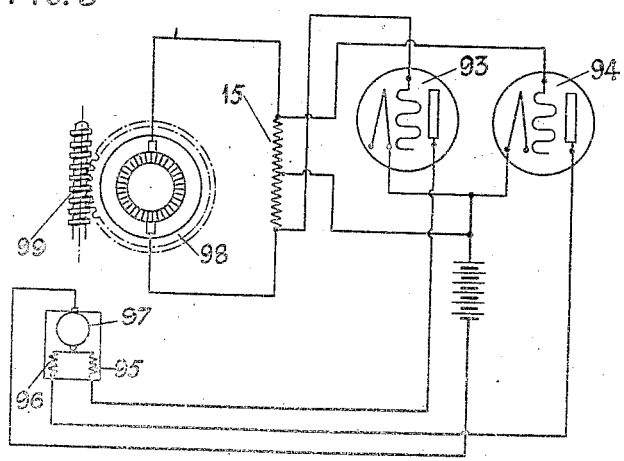
Fig. 5 is a wiring diagram of a system that may be used in connection with the compass illustrated in Fig. 4, which system functions as a repeater compass only.

Thus far I have been concerned with an apparatus used for steering ships. However, the invention may be used as a directional stabilizer generally, for such devices for example as aircraft. In fact, the arrangement can be used to stabilize a compass card or as a repeater compass. Such an adaptation is illustrated in Figs. 4 and 5. In Fig. 4, a section of a modified form of compass is shown, in which a compass card 90 is mounted on a rotatable frame 89 which carries the armature 1. This frame is supported on ball bearings 91 in the outer stationary frame 4, to which are attached the compass pointers 92. In other respects this modification is similar to that shown in Fig. 1.

The control in this instance operates on the frame 89 to rotate it and thereby to bring it back to the north and south position whenever it is deviated therefrom. This control is illustrated in Fig. 5, wherein is shown a small series reversible motor 97 of the pilot motor type, adapted to rotate frame 89, as by means of the worm and wheel connection 98, 99. The motor has two differentially arranged field coils 95 and 96, located respectively in the output circuits of tubes 93 and 94. While the output currents are equal, the motor 97 is at a standstill, due to the differential arrangement of coils 95 and 96. As soon as the card 90 deviates from its normal direction, brushes 5 and 6 which are mechanically in connection with this card, will also deviate from the north-south line, and a difference of potential will exist across the terminals of resistance 15. This difference is caused to be impressed upon the grids for the two tubes 93 and 94, which grids in turn cause a difference in current flow in the output circuits of these tubes. Therefore the coils 95 and 96 no longer balance, and the motor 97 is caused to turn frame 89 back to its desired position. Of course the motor 97 can be so adjusted, for the sake of stability, that it responds only for deviations larger than a certain amount. Furthermore the motor 97 is used on shipboard to operate a number of repeater compasses in a well-known manner.

Although only a pair of tubes is shown in Fig. 5 additional tubes may be added in the manner disclosed in the previous figures. Furthermore other modifications may also be made, as is apparent from the foregoing.

I claim:

1. In a system for stabilizing a body, a pair of rotatable members, means for so rotating the members always in the same direction that their speed difference is a function of both the extent and velocity of the departure of the body from its desired position, and a control system for returning the body to its desired position, and responsive to this difference.

2. In a system for stabilizing a body, a pair of electric motors, means for exciting these motors always in the same direction in such manner that their speed difference is a function of both the extent and velocity of the departure of the body from its desired position, and a control system for returning the body to its position, and responsive to this difference.

3. In a system for stabilizing a body, a controlling device for the body, means for automatically moving said controlling device in accordance with a function of the departure of the body from its desired position, means for manually moving said device, and means for connecting either the manual device or the automatic device to the controlling device, comprising an electric circuit, and a circuit controller controlling both said circuit and the energization of said automatic device.

4. In a system for stabilizing a body, means for producing E. M. F.'s in accordance with the extent, velocity and acceleration of the departure of the body from its desired position, and a controlling element operated in accordance with a function of said E. M. F.'s.

5. In a system for stabilizing a body, means for producing an E. M. F. varying as a continuous function of the acceleration of the departure of the body from its desired position, and a controlling element operated in accordance with a function of said E. M. F.

6. In a system for stabilizing a body, a pair of motors, means for supplying excitation to the motors in such manner that the difference in the value of the excitations is a function of the departure of the body from its desired position, a control element, means for moving said control element in accordance with the difference in movement of the motors, means for further exciting the motors in accordance with this difference, this excitation being such as to reduce the speed difference, means for manually moving said control element, means whereby either said manual means is rendered active, or the motors, and means responsive to the rendering of the manual means active, for reestablishing the said further excitation to a value that upon arrival of the body in the desired position, no speed difference would exist.

7. In a stabilizer system, a device for producing an electromotive force varying as a function of the deviation of a body from a desired condition, one or more electronic emission tubes arranged to be affected by a function of the electromotive force, and a pair of sources of motion oppositely affected by variations in said function of the electromotive force.

8. In a stabilizer system, a device for producing an electromotive force varying as a function of the deviation of a body from a desired condition, one or more electronic emission tubes arranged to be affected by a function of the electromotive force, a pair of sources of motion oppositely affected by variations in said function of the electromotive force, and a control element operated in accordance with the difference in motion of the two sources.

9. In a system for stabilizing a body, a pair of rotatable members, means for so rotating the members always in the same direction that their speed difference is a continuous function of the acceleration of the departure of the body from its desired position, and a control system for returning the body to its desired position, and responsive to this difference.

10. In a system for stabilizing a body, an electronic emission amplifier device, an input circuit and an output circuit for said device, means for affecting the input circuit with an E. M. F. that varies as the departure of the body from its desired position, a transformer having a winding in the output circuit, as well as another winding, another electronic emission amplifier device, an input circuit for said other device, said circuit including the other winding of the transformer, whereby said second device is operated in accordance with the velocity of the departure of the body from its desired position, an output circuit for said second device, a pair of motors affected by both of the output currents so as to vary their speeds in opposite directions in accordance with the variations in the output currents, and a control element operated in accordance with the difference in motion of the two motors.

11. In a system for stabilizing a body, a pair of electronic emission devices, an inductive coupling between said devices, means for affecting the first device with an E. M. F. that is a function of the departure of the body from the desired position, a pair of motors, means whereby the output currents affect the excitation of one motor in one direction, and the other motor in the other direction, whereby the difference in speed of the motors is made a function of the extent and velocity of the departure of the body from its desired position, and a control element operated in accordance with the difference in motion of the two motors.

In testimony whereof, I have hereunto set my hand.

NICOLAI MINORSKY.